United States Patent [19]

Takahashi et al.

[11] Patent Number: 4,948,153
[45] Date of Patent: Aug. 14, 1990

[54] METAL GASKET

[75] Inventors: Masakatsu Takahashi; Hiroo Buseki; Hidetoshi Kimura, all of Kanagawa, Japan

[73] Assignee: Nippon Reinz Co., Ltd., Kanagawa, Japan

[21] Appl. No.: 370,881

[22] Filed: Jun. 23, 1989

[51] Int. Cl.⁵ .......................... F02F 11/00; F16J 15/00
[52] U.S. Cl. .................... 277/235 B; 277/236
[58] Field of Search ............. 277/235 B, 236; 285/917

[56] References Cited

U.S. PATENT DOCUMENTS 3,091,472  5/1963  Balfe ............................ 277/235 B
3,767,216 10/1973  Martin ........................... 277/236 X

FOREIGN PATENT DOCUMENTS 580795   8/1955  Canada ......................... 277/235 B
55-24539 2/1980  Japan .
59-97364 6/1984  Japan .
255250   11/1986 Japan ........................... 277/235 B Primary Examiner—Allan N. Shoap
Assistant Examiner—Scott W. Cummings
Attorney, Agent, or Firm—Wenderoth, Lind & Ponack

[57] ABSTRACT

A metal gasket has an opening for allowing fluid to pass through the gasket, relatively small through-holes for receiving bolts, and a raised portion surrounding the entire circumference of the opening. The raised portion has a double-bead structure including an inner peripheral bead portion formed by an intermediate flat portion and a first frusto-conical portion which connects the intermediate flat portion with an inner peripheral flat portion, and an outer peripheral bead portion formed by the intermediate flat portion and a second frusto-conical portion which connects the intermediate flat portion with an outer peripheral flat portion. The second frusto-conical portion is inclined at an angle which is smaller than that at which the first frusto-conical portion is inclined.

4 Claims, 2 Drawing Sheets

METAL GASKET

BACKGROUND OF THE INVENTION

The present invention relates to a metal gasket which is, for example, disposed between a flange secured to an end of an exhaust pipe and a flange secured to an end of an exhaust purifier or a muffler to join together the exhaust pipe and the exhaust purifier or muffler in such a manner that no gas will leak through the joint between such members.

An exhaust pipe for expelling exhaust gas from an automotive engine is coupled to an exhaust purifier or a muffler which is provided in the intermediate portion of the exhaust pipe system in such a manner that no gas will leak through the joint between such members. The joint comprises two flanges which are secured to the respective ends of the exhaust pipe and the exhaust purifier or muffler by means, for example, of welding so as to butt against each other with a gasket interposed therebetween, the gasket being pressed between the flanges when the flanges are fastened together by means of nuts and bolts.

A gasket consisting essentially of asbestos, carbon or the like has heretofore been employed between a pair of flanges to prevent leakage of gas through the joint, as stated above. However, with the rise in the exhaust gas temperature as a result of the wide use of superchargers, there has been a growing tendency to use metal gaskets which exhibit superior heat resistance and are easy to handle.

SUMMARY OF THE INVENTION

It is a primary object of the present invention to enhance the sealing effectiveness of conventional metal gaskets.

To this end, the present invention provides a metal gasket which is formed from a single metal plate or a plurality of stacked metal plates each having an opening for allowing a fluid to pass therethrough, relatively small through-holes for receiving bolts, and a raised portion surrounding the entire circumference of the opening, wherein the raised portion has a double-bead structure comprising an inner peripheral bead portion constituted by an intermediate flat portion, and a first frusto-conical slant portion which connects the intermediate flat portion with an inner peripheral flat portion, and an outer peripheral bead portion constituted by the intermediate flat portion, and a second frust-conical slant portion which connects the intermediate flat portion with an outer peripheral flat portion. According to the invention, the second slant portion constituting the outer peripheral bead portion is inclined at an angle relative to the flat peripheral portion which is smaller than that at which the first slant portion constituting the inner peripheral bead portion is inclined.

BRIEF DESCRIPTION OF THE DRAWINGS

FIGS. 1 to 3 show one embodiment of the metal gasket according to the present invention, in which:

FIG. 1 is a plan view;

FIG. 2 is an enlarged sectional view taken along line 2—2 of FIG. 1; and

FIG. 3 is an enlarged sectional view taken along the line 3—3 of FIG. 1.

DETAILED DESCRIPTION OF THE INVENTION

Figure 4:
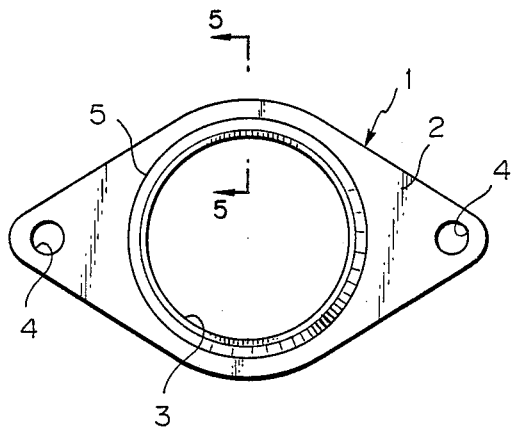
FIG. 4 is a plan view of a conventional metal gasket.
Figure 5:
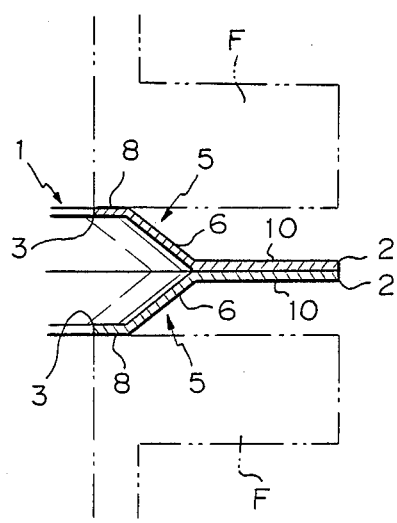
FIG. 5 is an enlarged sectional view taken along the line 5—5 of FIG. 4.
Figure 6:
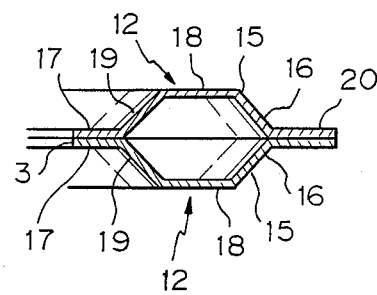
FIG. 6 is a sectional view corresponding to FIG. 5, which shows another conventional metal gasket.

A typical conventional metal gasket which is clamped between a pair of flanges to join together an exhaust pipe and an exhaust purifier or the like in such a manner that no gas will leak through the joint has heretofore been arranged as shown in FIGS. 4 to 6.

More specifically, the metal gasket 1 comprises a single metal plate or a plurality (two in the illustrated example) of stacked metal plates 2. Each metal plate 2 has an opening 3 for allowing exhaust gas to pass therethrough in the center thereof and two relatively small through-holes 4 for receiving bolts used to fasten together a pair of flanges, the through-holes 4 being formed in opposite end portions, respectively, of the metal plates 2. The metal plates 2 are typically made of a stainless steel. The periphery of the opening 3 in each metal plate 2 is raised to form an annular raised portion 5 which surrounds the entire circumference of the opening 3 so that, when the metal gasket 1 is clamped between a pair of flanges, the periphery of the opening 3 is subjected to a particularly high pressure, thereby achieving reliable and effective airtight sealing of the periphery of the opening 3. It should be noted that in FIG. 5 flanges F which are respectively secured to pipe elements, for example, an exhaust pipe, are schematically shown.

Each raised portion 5 is, as shown in FIG. 5, comprised of a raised flat portion 8 formed concentrically with the opening 3 and an annular slant portion 6 which is contiguous with a flat portion 10 constituting the body of a metal plate 2. In the example shown in FIG. 5, two metal plates 2 with the same configuration are disposed in a mirror image relation to each other to form a gasket 1. When the gasket 1 is clamped between a pair of flanges, the slant portions 6 are elastically deformed to thereby increase the level of force with which the peripheries of the openings 3 are pressed against the respective flanges F.

In the example shown in FIG. 5, one raised flat portion 8 is provided with one bead portion, that is, one bent portion comprising the flat portion 8 and the slant portion 6, whereas, in the example shown in FIG. 6, two bead portions are provided for one raised portion. Referring now to FIG. 6, a raised portion 15 of a metal plate 12 comprises a raised flat portion, i.e., an intermediate flat portion 18, a first slant portion 19 which connects intermediate flat portion 18 with an inner peripheral flat portion 17, and a second slant portion 16 which connects the intermediate flat portion 18 with an outer peripheral flat portion 20. In this example, one flat portion 18 has two bead portions which are respectively formed along the inner and outer peripheries thereof and, therefore, each metal plate 12 is pressed against the corresponding flange with a particularly strong force at two portions. Thus, the airtight sealing capability is increased by a kind of labyrinth seal effect.

The conventional metal gasket described above suffers, however, from the following disadvantages.

If each metal plate of the metal gasket 1 is merely provided with two bead portions which are elastically deformed when the metal gasket 1 is pressed between a pair of flanges so as to provide a reliable and effective airtight sealing effect in the metal gasket 1, as shown in FIG. 6, the force that is needed to elastically deform the bead portions to a sufficiently extent increases unnecessarily and it becomes difficult to tighten the nuts and bolts to join together the two flanges.

The present invention aims at solving the above-described disadvantages of the prior art.

The present invention will be described below in more detail by way of one embodiment and with reference to the accompanying drawings.

Figure 1:
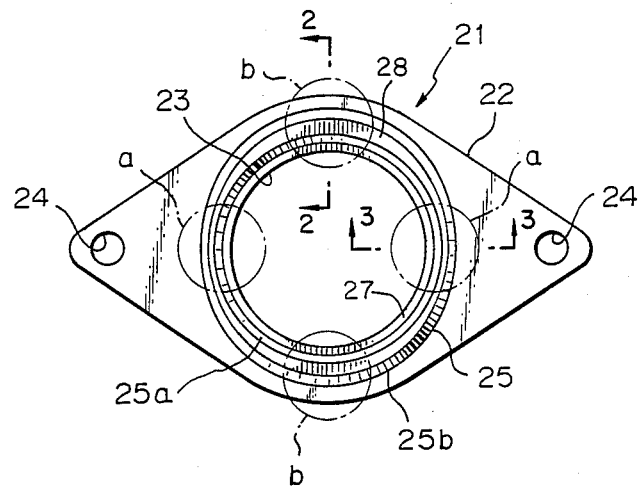
Figure 2:
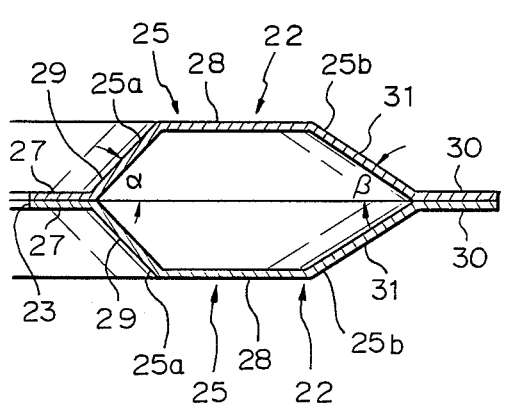
Figure 3:
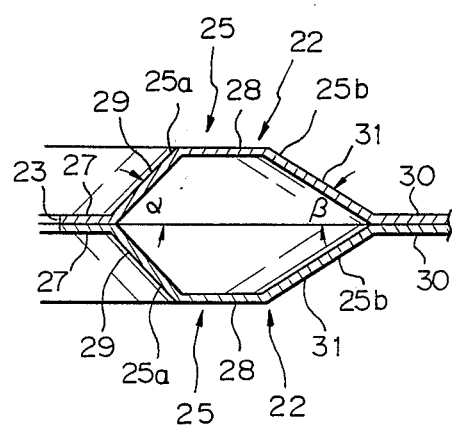

FIGS. 1 to 3 show one embodiment of the metal gasket according to the present invention, in which: FIG. 1 is a plan view; FIG. 2 is an enlarged sectional view taken along line 2—2 of FIG. 1; and FIG. 3 is an enlarged sectional view taken along the line 3—3 of FIG. 1.

A metal gasket 21 comprises two stacked metal plates 22. Each metal plate 22 has a circular opening 23 for allowing a fluid, for example, exhaust gas, to pass therethrough and which opening is formed in the center of the plate 22, and relatively small through-holes 24 for receiving bolts which are formed in opposite end portions, respectively, of the plate 22. The periphery of the plate surrounding the opening 23 in each metal plate 22 is raised to form a raised portion 25 which surrounds the entire circumference of the opening 23.

The raised portion 25 of each metal plate 22 comprises an inner peripheral bead portion 25a and an outer peripheral bead portion 25b. The inner peripheral bead portion 25a is constituted by an intermediate flat portion 28 and a first frusto-conical slant portion 29 which connects the intermediate flat portion 28 with an inner periphery flat portion 27. The outer peripheral bead portion 25b is constituted by the intermediate flat portion 28 and a second frusto-conical slant portion 31 which connects the intermediate flat portion 28 with an outer peripheral flat portion 30 and which slants in a direction opposite to the direction in which the first slant portion 29 slants. Thus, the metal plate 22 has two elastically deformable portions at the inner and outer peripheries, respectively, of the raised portion 25. In this embodiment, the two metal plates 22 are disposed in a mirror image relation to each other so that a hollow structure is defined between the two raised portions 25.

The width of the second slant portion 31 that constitutes the outer peripheral bead portion 25b is set so as to be greater than the width of the first slant portion 29 constituting the inner peripheral bead portion 25a, and thus the angle of inclination of the second slant portion 31 is smaller than that of the first slant portion 29 (i.e., $\alpha > \beta$), thereby allowing the outer peripheral bead portion 25b to be deformed more easily than the inner peripheral bead portion 25a.

The width of the intermediate flat portion 28 that is present between the inner and outer peripheral bead portions 25a and 25b varies such that the width of those portions (the portions "a" shown in FIG. 1) of the intermediate flat portion 28 which are closer to the bolt receiving through-holes 24 is smaller than the width of the portions (the portions "b" shown in FIG. 1) thereof which are remote from the through-holes 24. Accordingly, the width of those portions of the raised portion 25 which are closer to the bolt receiving through-holes 24 is smaller than the width of the portions thereof which are remote from the through-holes 24.

In this regard, the intermediate flat portion 28 is formedf such that the inner peripheral edge thereof has a configuration which is smaller to that of the opening 23 (i.e., a circular configuration in the illustrated example), while the outer peripheral edge of the intermediate flat portion 28 is in the shape of an ellipse, the minor axis of which extends along an imaginary straight line intersecting the bolt receiving through-holes 24, and thus the distance between the through-holes 24 and the raised portion 25 is maximized in this direction.

The metal gasket 21 of the present invention arranged as described above is clamped between a pair of flanges, and nuts are screwed onto bolts extending through the through-holes 24 and tightened to thereby reduce the distance between the two flanges and thus elastically compress the raised portions 25.

Thus, by tightening the nuts and the bolts extending through the through-holes 24, the inner and outer peripheral bead portions 25a and 25b that constitute, in combination, the raised portions 25 are compressed between the pair of flanges. Since the angle of inclination of the second slant portion 31 constituting the outer peripheral bead portion 25b is smaller than that of the first slant portion 29 constituting the inner peripheral bead portion 25a, the level of force which is needed to elastically compress the outer peripheral bead portion 25b is lower than that needed for the inner peripheral bead portion 25a.

Accordingly, although the raised portion 25 has a double-bead structure comprising the inner and outer peripheral bead portions 25a and 25b, the raised portion 25 can be satisfactorily deformed without the need for extra force and there is no particular difficulty in tightening the nuts and bolts for joining together the two flanges.

When the metal gasket 21 of the present invention is tightly clamped between a pair of flanges as described above, the level of pressure against each flange at the inner peripheral bead portion 25a including the first slant portion 29 having a relatively great angle of inclination is higher than that against the flange at the outer peripheral bead portion 25b including the second slant portion 31 having a relatively small angle of inclination, so that a majority of the airtight sealing effect at the periphery of the opening 23 is afforded by the inner peripheral bead portion 25a. Accordingly, only a little fluid, for example, exhaust gas, can reach the outer side of the inner peripheral bead portion 25a and the pressure level of the fluid is low.

Therefore, if a leakage should occur at the inner peripheral bead portion 25a, the leaking fluid is easily blocked by the outer peripheral bead portion 25b and there is substantially no possibility of the fluid leaking to the outer side of the outer peripheral bead portion 25b.

In addition, since the width of those portions of the raised portion 25 which are closer to the bolt receiving through-holes 24 is made smaller than the width of the portions thereof which are remote from the through-holes 24 and thus the distance between the through-holes 24 and the raised portion is maximized, it is possible to prevent the level of pressure applied to the raised portion 25 from becoming extremely high at particular portions (near the bolt-receiving through-holes 24) when the nuts and bolts are tightened. Thus, it is possible not only to enable the raised portion 25 to be compressed substantially uniformly over the whole circumstances thereof but also to eliminate the possibility of the raised portion 25 partially yielding during use.

Although the present invention has been described by way of an example in which the metal gasket comprises two metal plates which are aligned in a mirror image relation to each other, it should be noted here that the metal gasket of the present invention may employ only one of the metal plates 22 shown in FIGS. 2 and 3. In this case, the inner peripheral bead portion 25a comprising the first slant portion 29 and the intermediate flat portion 28 and the outer peripheral bead portion 25b comprising the second slant portion 31 and the intermediate flat portion 28 are strongly pressed against one flange, while a bead portion which comprises the first slant portion 29 and the inner peripheral flat portion 27 and another bead portion which comprises the second slant portion 31 and the outer peripheral flat portion 30 are strongly pressed against the other flange. Thus, two bead portions are provided for each of the two flanges.

Although the present invention has been described in specific terms, it should be noted that the described embodiments are not necessarily exclusive and that various changes and modifications may be imparted thereto without departing from the scope of the invention which is limited solely by the appended claims.

What is claimed is:

1. A metal gasket comprising a metal plate defining an opening therethrough for allowing fluid to pass through the gasket, and through-holes extending therethrough which are relatively small compared to said opening and are sized to receive bolts, and said metal plate having an inner peripheral flat portion surrounding said opening, an outer peripheral flat portion spaced radially outwardly of said inner peripheral flat portion with respect to said opening, and a raised portion extending around the entire circumference of said opening and connected between said peripheral flat portions, said raised portion including an intermediate flat portion of the metal plate disposed in a plane spaced axially from a plane in which said opening lies, a first frusto-conical portion of the metal plate extending between said intermediate flat portion and said inner peripheral flat portion, and a second frusto-conical portion of the metal plate extending between said intermediate flat portion and said outer peripheral flat portion, and said second frusto-conical portion being inclined at an angle with respect to the plane in which said opening lies that is smaller than that at which said first frusto-conical portion is inclined.

2. A metal gasket according to claim 1, wherein the width of said intermediate flat portion located closer to said relatively small through-holes is smaller than the width of said intermediate flat portion remote from said through-holes.

3. A metal gasket comprising a plurality of metal plates disposed in a mirror image relation to one another, each of said metal plates defining an opening therethrough for allowing fluid to pass through the gasket, and through-holes extending therethrough which are relatively small compared to said opening and are sized to receive bolts, and each of said metal plates having an inner peripheral flat portion surrounding said opening, an outer peripheral flat portion spaced radially outwardly of said inner peripheral flat portion with respect to said opening, and a raised portion extending around the entire circumference of said opening and connected between said peripheral flat portions, said raised portion including an intermediate flat portion of the respective metal plate disposed in a plane is spaced axially from a plane in which said opening lies, a first frusto-conical portion of the respective metal plate extending between said intermediate flat portion and said inner peripheral flat portion, and a second frusto-conical portion of the respective metal plate extending between said intermediate flat portion and said outer peripheral flat portion, and said second frusto-conical portion being inclined at an angle with respect to the plane in which said opening lies that is smaller than that at which said first frusto-conical portion is inclined.

4. A metal gasket as claimed in claim 3, wherein, in each of said metal plates the width of said intermediate flat portion located closer to said relatively small through-holes is smaller than the width of said intermediate flat portion remote from said through-holes.

* * * * *

UNITED STATES PATENT AND TRADEMARK OFFICE
CERTIFICATE OF CORRECTION

PATENT NO. : 4,948,153

DATED : August 14, 1990

INVENTOR(S) : Masakatsu TAKAHASHI et al.

It is certified that error appears in the above-identified patent and that said Letters Patent is hereby corrected as shown below:

The following priority data has been inserted on the cover page of the above-identified patent between items [22] and [51]:

--[30] Foreign Application Priority Data
   June 30, 1988[JP] Japan................63-85852[U]--

Signed and Sealed this

Tenth Day of March, 1992

Attest:

HARRY F. MANBECK, JR.

*Attesting Officer*       *Commissioner of Patents and Trademarks*